US010091763B2

(12) United States Patent
Bergman et al.

(10) Patent No.: US 10,091,763 B2
(45) Date of Patent: Oct. 2, 2018

(54) PAGING IN COVERAGE EXTENSION MODE

(71) Applicant: Telefonaktiebolaget LM Ericsson (publ), Stockholm (SE)

(72) Inventors: Johan Bergman, Stockholm (SE); Konstantinos Dimou, San Francisco, CA (US); Erik Eriksson, Lingköping (SE); Anders Wallén, Ystad (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 138 days.

(21) Appl. No.: 14/913,168

(22) PCT Filed: Aug. 21, 2014

(86) PCT No.: PCT/SE2014/050958
§ 371 (c)(1),
(2) Date: Feb. 19, 2016

(87) PCT Pub. No.: WO2015/026285
PCT Pub. Date: Feb. 26, 2015

(65) Prior Publication Data
US 2016/0205659 A1  Jul. 14, 2016

Related U.S. Application Data

(60) Provisional application No. 61/868,383, filed on Aug. 21, 2013.

(51) Int. Cl.
*H04W 76/27* (2018.01)
*H04W 68/02* (2009.01)
(Continued)

(52) U.S. Cl.
CPC ............ *H04W 68/02* (2013.01); *H04J 11/00* (2013.01); *H04L 1/1812* (2013.01);
(Continued)

(58) Field of Classification Search
CPC ............ H04W 68/02; H04W 72/0413; H04W 72/042; H04W 72/048; H04W 72/14;
(Continued)

(56) References Cited

U.S. PATENT DOCUMENTS 5,539,748 A * 7/1996 Raith .................... H04B 7/2643
370/329
5,760,705 A * 6/1998 Glessner ............. H04W 84/025
340/4.21

(Continued)

FOREIGN PATENT DOCUMENTS

EP  1339250 A2  8/2003
EP  3032897 A1  6/2016
(Continued)

OTHER PUBLICATIONS

Unknown, Author, "Paging for MTC UEs operating in coverage enhancement mode", 3GPP TSG-RAN WG1 Meeting #74, R1-133041, Barcelona, Spain, Aug. 19-23, 2013, 1-2.

*Primary Examiner* — Kevin D Mew
(74) *Attorney, Agent, or Firm* — Sage Patent Group

(57) ABSTRACT

A method for supporting paging of user terminals by a base station that supports first and second paging modes, the second paging mode providing extended coverage relative to the first paging mode and using more resources than the first paging mode is provided. The method includes determining that the second paging mode is needed for a user terminal, and then initiating paging of the user terminal according to the second paging mode, in response to the determining. In some embodiments, the node is a mobility management node, and initiating paging of the user terminal includes sending, to the base station, a message ordering the base station to page the user terminal according to the second paging mode. In other embodiments, the node is the base station, and initiating paging includes transmitting one or
(Continued)

more paging messages using a message format corresponding to the second paging mode.

30 Claims, 9 Drawing Sheets

(51) Int. Cl.
- H04J 11/00 (2006.01)
- H04L 1/18 (2006.01)
- H04L 5/00 (2006.01)
- H04W 72/04 (2009.01)
- H04W 72/14 (2009.01)
- H04W 88/02 (2009.01)
- H04W 88/08 (2009.01)

(52) U.S. Cl.
CPC ......... *H04L 5/0055* (2013.01); *H04W 72/042* (2013.01); *H04W 72/048* (2013.01); *H04W 72/0413* (2013.01); *H04W 72/14* (2013.01); *H04W 76/27* (2018.02); *H04W 88/02* (2013.01); *H04W 88/08* (2013.01)

(58) Field of Classification Search
CPC ... H04W 76/046; H04W 88/02; H04W 88/08; H04J 11/00; H04L 1/1812; H04L 5/0055
See application file for complete search history.

(56) References Cited

U.S. PATENT DOCUMENTS

| | | | | |
|---|---|---|---|---|
| 6,023,624 A * | 2/2000 | Hanson | ................ | H04W 68/04 455/458 |
| 6,141,317 A * | 10/2000 | Marchok | ............... | H04L 5/0046 370/207 |
| 6,253,078 B1 * | 6/2001 | Lee | ..................... | H04W 84/022 455/426.1 |
| 8,649,807 B1 * | 2/2014 | Oroskar | ................. | H04W 8/02 455/432.1 |
| 9,326,207 B2 * | 4/2016 | Jha | ........................ | H05K 999/00 |
| 9,622,215 B2 * | 4/2017 | Zhang | .................... | H04W 4/021 |
| 2002/0025811 A1 * | 2/2002 | Willey | .............. | H04W 52/0216 455/434 |
| 2004/0248573 A1 * | 12/2004 | Wandel | ................. | H04W 24/00 455/435.1 |
| 2006/0056342 A1 * | 3/2006 | Lee | ........................ | H04W 68/12 370/328 |
| 2008/0207227 A1 * | 8/2008 | Ren | ........................ | H04W 68/00 455/458 |
| 2008/0280630 A1 * | 11/2008 | Kalhan | ................. | H04L 1/0004 455/458 |
| 2009/0143083 A1 * | 6/2009 | Goeusse | ............... | H04W 68/02 455/458 |
| 2009/0227265 A1 * | 9/2009 | Kang | .................... | H04W 60/04 455/456.1 |
| 2010/0041399 A1 * | 2/2010 | Kim | .................... | H04W 74/006 455/434 |
| 2010/0240400 A1 * | 9/2010 | Choi | ..................... | H04W 68/02 455/458 |
| 2011/0105155 A1 * | 5/2011 | Bienas | .................. | H04W 68/02 455/458 |
| 2011/0110251 A1 * | 5/2011 | Krishnamurthy | ... | H04W 72/082 370/252 |
| 2013/0064157 A1 * | 3/2013 | Lindgren | .......... | H04W 52/0216 370/311 |
| 2013/0083753 A1 | 4/2013 | Lee et al. | | |
| 2013/0170347 A1 * | 7/2013 | Zhang | ..................... | H04W 4/70 370/230 |
| 2013/0272148 A1 * | 10/2013 | Fong | ..................... | H04W 28/02 370/252 |
| 2014/0128082 A1 * | 5/2014 | Chirayil | ................ | H04W 68/02 455/438 |
| 2016/0095076 A1 * | 3/2016 | Xiong | ..................... | H04W 4/70 370/336 |
| 2016/0338008 A1 * | 11/2016 | Xia | ........................ | H04W 48/10 |
| 2016/0345294 A1 * | 11/2016 | Bennett | ................. | H04W 68/02 |
| 2017/0230934 A1 * | 8/2017 | Bienas | ................. | H04W 68/02 |

FOREIGN PATENT DOCUMENTS

| | | | | |
|---|---|---|---|---|
| WO | 2004002186 A2 | 12/2003 | | |
| WO | WO 2013016862 A1 * | 2/2013 | ............ | H04W 4/005 |
| WO | 2014055878 A1 | 4/2014 | | |

* cited by examiner

PAGING IN COVERAGE EXTENSION MODE

TECHNICAL FIELD

The present disclosure is generally related to wireless communication networks, and is more particularly related to signaling in connection with the paging of mobile terminals in a coverage extension mode.

BACKGROUND

The $3^{rd}$-Generation Partnership Project (3GPP) has developed a wireless communication technology known as Long Term Evolution (LTE), as documented in the specifications for the Evolved Universal Terrestrial Radio Access Network (E-UTRAN). LTE is a mobile broadband wireless communication technology in which transmissions from base stations (referred to as eNodeBs or eNBs in 3GPP documentation) to user terminals (referred to as user equipment, or UEs, in 3GPP documentation) are sent using orthogonal frequency-division multiplexing (OFDM). OFDM splits the transmitted signal into multiple parallel sub-carriers in frequency.

More specifically, LTE uses OFDM in the downlink and Discrete Fourier Transform (DFT)-spread OFDM in the uplink. The basic LTE downlink physical resource can be viewed as a time-frequency resource grid. FIG. 1 illustrates a portion of the available spectrum of an exemplary OFDM time-frequency resource grid 50 for LTE. Generally speaking, the time-frequency resource grid 50 is divided into one millisecond subframes. As shown in FIG. 3, each subframe includes a number of OFDM symbols. For a normal cyclic prefix (CP) length, which is suitable for use in situations where multipath dispersion is not expected to be extremely severe, a subframe consists of fourteen OFDM symbols. A subframe has only twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency resource grid 50 is a resource element. A resource element consists of one OFDM subcarrier during one OFDM symbol interval.

LTE resource elements are grouped into resource blocks (RBs), each of which, in its most common configuration, consists of twelve subcarriers and seven OFDM symbols (one slot). Thus, a RB typically consists of 84 resource elements. The two RBs occupying the same set of twelve subcarriers in a given radio subframe (two slots) are referred to as an RB pair, which includes 168 resource elements if a normal CP is used. Thus, an LTE radio subframe is composed of multiple RB pairs in frequency, with the number of RB pairs determining the bandwidth of the signal.

In the time domain, LTE downlink transmissions are organized into radio frames of 10 ms, each radio frame consisting of ten equally-sized subframes of length $T_{subframe}=1$ ms. This is shown in FIG. 2.

The signal transmitted by an eNB to one or more UEs may be transmitted from multiple antennas. Likewise, the signal may be received at a UE that has multiple antennas. The radio channel between the eNB distorts the signals transmitted from the multiple antenna ports. To successfully demodulate downlink transmissions, the UE relies on reference symbols (RS) that are transmitted on the downlink. Several of these reference symbols are illustrated in the resource grid 50 shown in FIG. 3. These reference symbols and their position in the time-frequency resource grid are known to the UE and hence can be used to determine channel estimates by measuring the effect of the radio channel on these symbols.

Messages transmitted over the radio link to users can be broadly classified as control messages or data messages. Control messages are used to facilitate the proper operation of the system as well as proper operation of each UE within the system. Control messages include commands to control functions such as the transmitted power from a UE, signaling to identify RBs within which data is to be received by the UE or transmitted from the UE, and so on.

Specific allocations of time-frequency resources in the LTE signal to system functions are referred to as physical channels. For example, the physical downlink control channel (PDCCH) is a physical channel used to carry scheduling information and power control messages. The physical HARQ indicator channel (PHICH) carries ACK/NACK in response to a previous uplink transmission, and the physical broadcast channel (PBCH) carries system information. The primary and secondary synchronization signals (PSS/SSS) can also be seen as control signals, and have fixed locations and periodicity in time and frequency so that UEs that initially access the network can find them and synchronize. Similarly, the PBCH has a fixed location relative to the primary and secondary synchronization signals (PSS/SSS). The UE can thus receive the system information transmitted in BCH and use that system information to locate and demodulate/decode the PDCCH, which carries control information specific to the UE.

As of Release 10 of the LTE specifications, all control messages to UEs are demodulated using channel estimates derived from the common reference signals (CRS). This allows the control messages to have a cell-wide coverage, to reach all UEs in the cell without the eNB having any particular knowledge about the UEs' positions. Exceptions to this general approach are the PSS and SSS, which are stand-alone signals and do not require reception of CRS before demodulation. The first one to four OFDM symbols of the subframe are reserved to carry such control information. The example subframe shown in FIG. 3 has a control region of three OFDM symbols. The actual number of OFDM symbols reserved to the control region may vary, depending on the configuration of each cell. The particular number n=1, 2, 3 or 4 for a given cell is known as the Control Format Indicator (CFI), and is indicated by the physical CFI channel (PCHICH), which is transmitted in the first symbol of the control region.

Downlink transmissions in LTE are dynamically scheduled, meaning that in each subframe the base station transmits control information about which terminals data is transmitted to and upon which resource blocks the data is transmitted, for the current downlink subframe. The dynamic scheduling information is communicated to the user equipments (UEs) via the PDCCH, which is transmitted in the control region. After successful decoding of a PDCCH, the UE performs reception of the Physical Downlink Shared Channel (PDSCH) or transmission of the Physical Uplink Shared Channel (PUSCH) according to predetermined timing specified in the LTE specs. In addition to the PDCCH, the control region in the downlink signal from the base station also contains the Physical HARQ Indication Channels (PHICH), which carry hybrid-ARQ acknowledgements (ACK/NACK) corresponding to uplink transmissions from the UEs served by the base station.

The downlink Layer 1/Layer 2 (L1/L2) control signaling transmitted in the control region thus consists of the following different physical-channel types:

The Physical Control Format Indicator Channel (PC-FICH), informing the terminal about the size of the control region (one, two, or three OFDM symbols). There is one and only one PCFICH on each component carrier or, equivalently, in each cell. The Physical Downlink Control Channel (PDCCH), used to signal downlink scheduling assignments and uplink scheduling grants. Each PDCCH typically carries signaling for a single terminal, but can also be used to address a group of terminals. Multiple PDCCHs can exist in each cell.

The Physical Hybrid-ARQ Indicator Channel (PHICH), used to signal hybrid-ARQ acknowledgements in response to uplink UL-SCH transmissions. Multiple PHICHs can exist in each cell.

The PDCCH is used to carry downlink control information (DCI) such as scheduling decisions and power-control commands. More specifically, the DCI includes:

Downlink scheduling assignments, including PDSCH resource indication, transport format, hybrid-ARQ information, and control information related to spatial multiplexing (if applicable). A downlink scheduling assignment also includes a command for power control of the PUCCH used for transmission of hybrid-ARQ acknowledgements in response to downlink scheduling assignments.

Uplink scheduling grants, including PUSCH resource indication, transport format, and hybrid-ARQ-related information. An uplink scheduling grant also includes a command for power control of the PUSCH.

Power-control commands for a set of terminals as a complement to the commands included in the scheduling assignments/grants.

One PDCCH carries one DCI message with one of the formats above. Since multiple terminals can be scheduled simultaneously, on both downlink and uplink, there must be a possibility to transmit multiple scheduling messages within each subframe. Each scheduling message is transmitted on a separate PDCCH, and consequently there are typically multiple simultaneous PDCCH transmissions within each cell. Furthermore, to support different radio-channel conditions, link adaptation can be used, where the code rate of the PDCCH is selected to match the radio-channel conditions.

Control messages can be categorized into messages that need to be sent only to one UE (UE-specific control) and those that need to be sent to all UEs or some subset of UEs (common control) within the cell being covered by the eNB. Messages of the first type, UE-specific control messages, are typically sent using the PDCCH.

Control messages of PDCCH type are demodulated using CRS and transmitted in multiples of units called control channel elements (CCEs) where each CCE contains 36 REs. A PDCCH message may have an aggregation level (AL) of one, two, four, or eight CCEs. This allows for link adaptation of the control message. Each CCE is mapped to nine resource element groups (REGs) consisting of four RE each. The REGs for a given CCE are distributed over the system bandwidth to provide frequency diversity for a CCE. This is illustrated in FIG. 4. Hence, a PDCCH message can consist of up to eight CCEs, spanning the entire system bandwidth in the first one to four OFDM symbols, depending on the configuration.

The LTE Paging Procedure

In LTE networks, a UE is in a RRC_CONNECTED mode or state when a Radio Resource Control (RRC) connection has been established between the UE and the network. Otherwise, the UE is in an RRC_IDLE mode or state. The LTE network uses a paging process to initiate access to a terminal when the UE is in RRC_IDLE mode. Details corresponding to a paging message are scheduled with a DCI message in the common search space, with the Cyclic Redundancy Check (CRC) field of the DCI message scrambled with a P-RNTI. The DCI message points to a corresponding message that is sent on PDSCH. For the purposes of this disclosure, the term "paging message" refers to any control channel message that alerts the UE to the existence of a page. The data carried by the PDSCH and pointed to by the paging message is referred to herein as the "paging message details." In LTE systems, the "paging message" and the "paging message details" can thus be viewed as separate messages. In other systems, however, a "paging message" may carry the paging message details itself.

When the UE is in RRC_IDLE mode, the cell in which the UE is located is generally not known by the network. Therefore the paging message is typically transmitted in each of several cells. These several cells form an entity that is called a tracking area. The tracking area is controlled by the Mobility Management Entity (MME), which keeps track of which tracking area the UE belongs to. The MME is able to do this since the UE reports to the MME whenever it enters a new tracking area.

Paging messages targeted to a given terminal are scheduled for transmission in scheduling occasions that occur in a very sparse manner in time. This approach allows the terminal to be in Discontinuous Receive (DRX) state as much as possible, to save battery power. The subframe in which the terminal wakes up and monitors paging messages is given by a formula that takes into account the identity of the terminal, a cell-specific paging cycle and, optionally, a UE-specific paging cycle.

PDCCH Monitoring

LTE defines so-called search spaces, which define the set of CCEs the terminal is supposed to monitor for scheduling assignments/grants relating to a certain component carrier. A search space is a set of candidate control channels formed by CCEs on a given aggregation level, which the terminal is supposed to attempt to decode. As there are multiple aggregation levels, corresponding to one, two, four, and eight CCEs, a terminal has multiple search spaces. In each subframe, the terminals will attempt to decode all the PDCCHs that can be formed from the CCEs in each of its search spaces. If the Cyclic Redundancy Check (CRC) checks, the content of the control channel is declared as valid for this terminal and the terminal processes the information (scheduling assignment, scheduling grants, etc.). Each terminal in the system therefore has a terminal-specific search space at each aggregation level. These terminal-specific search spaces are collectively called the UE-specific search space (USS).

In several situations, there is a need to address a group of, or all, terminals in the system. To allow all terminals to be addressed at the same time, LTE has defined common search spaces in addition to the terminal-specific search spaces. Again, while there is a common search space for each aggregation level, these are often collectively referred to as the common search space (CSS). The common search space is, as the name implies, common, and all terminals in the cell monitor the CCEs in the common search spaces for control information. Although the motivation for the common search space is primarily transmission of various system messages, it can be used to schedule individual terminals as well. Thus, it can be used to resolve situations where scheduling of one terminal is blocked due to lack of available resources in the terminal-specific search space. More importantly, the common search space is not dependent on UE configuration status. Therefore, the common search space can be used when the network needs to communicate with the UE during UE reconfiguration periods.

A UE thus monitors a common search space and a UE-specific search space in the PDCCH. In each of these search spaces, a limited number of candidates (equivalently, PDCCH transmission hypotheses) are checked, in every downlink subframe for which the UE is in RRC_CONNECTED mode and in a non-DRX interval. For a UE in RRC_IDLE mode, the UE monitors the common search space at least for each paging subframe that is part of the paging cycle. These hypotheses are known as blind decodes, and the UE checks whether any of the transmitted DCI messages is intended for it. The UE knows that the downlink control information is intended for it if the scrambling mask of the CRC of the control message is identical to the expected RNTI of the message. For instance, if a paging message is expected in a subframe, the UE searches the transmitted control channels in that subframe for a message with CRC scrambled with the paging-RNTI (P-RNTI). The UE also monitors other RNTI, such as C-RNTI for scheduling of the shared data channel or the SI-RNTI for scheduling of system information.

Enhanced Control Signaling

As of Release 11 of the standards for LTE, it has been agreed to introduce UE-specific transmission for control information in form of enhanced control channels by allowing the transmission of generic control messages to a UE using UE-specific reference signals and the data region. This enhancement means that precoding gains can be achieved also for the control channels. Another obvious benefit is that more resources may be used for control signaling, as needed.

Extended Coverage

In a future "networked society" scenario it is expected that there will be a very large number of machine-type-communication (MTC) devices active in wireless networks. Many such devices will transmit small amount of uplink data, e.g., 100 bits or so, very occasionally, e.g., once per hour or so. In the 3GPP working groups standardizing improvements to LTE systems, there are plans to introduce a new solution for "enhanced MTC coverage," with a target to improve the link budget by approximately 15-20 dB compared to the link budgets supported by the legacy LTE standard. This will make LTE even more attractive for the deployment of MTC devices and applications. Note that the terms "extended coverage" and "enhanced coverage" are used interchangeably, and refer to technical solutions, in a wireless network, that provide substantially improved link budgets, compared to normal communications in the wireless network, typically by providing an alternative communication scheme that employs a much higher degree of redundancy than normal communications in that same wireless network.

To achieve coverage enhancements on the order of 15-20 dB in LTE, multiple physical channels and physical signals will need to be improved. The required improvements are quite large—20 dB coverage improvement is equivalent to operation at 100 times lower signal-to-noise ratios—and LTE is already very good, in that there is no known flaw in the current design of LTE that can be corrected to provide improvements anywhere near 100 times. As a result, it is likely that most of the required coverage improvements will be achieved through the transmitting of highly redundant information, e.g., through ordinary repetition of the transmitted information. Current LTE signals cannot easily just be repeated approximately 100 times, for example due to timing constraints during connection setup and other procedures, so new signals and related procedures will likely need to be defined for this purpose.

SUMMARY

Paging is used for the system to reach the UEs (User Equipment) in the event of network-initiated data transmissions or to inform a UE of system updates. A UE that is only able to obtain coverage in enhanced coverage mode will not be able to be reached by normal paging procedures. Thus, a new channel for paging is needed. As discussed in detail below, the overhead from paging in extended coverage mode will be larger than for normal paging procedures and thus will consume more network resources. Thus, it should be avoided when possible.

With existing solutions, a network would always have to page UEs using both normal mode and extended coverage mode, when and where extended coverage mode is enabled. There is also no rule for the UE to know where to look for paging messages in a network supporting extended coverage.

Disclosed herein are techniques for determining when extended coverage paging is needed. In some embodiments of the disclosed techniques, the network selectively pages the UE using either normal mode paging or coverage extension mode paging, or both, depending on the expected UE need for coverage extension. The UE monitors for normal mode paging or coverage extension mode paging according to well defined rules.

An example method according to some of the techniques detailed below is implemented in a node of a wireless communication network and is for supporting paging of user terminals by a base station that supports first and second paging modes, the second paging mode providing extended coverage relative to the first paging mode and using more resources than the first paging mode. This example method includes first determining that the second paging mode is needed for a user terminal, and then initiating paging of the user terminal according to the second paging mode, in response to said determining. In some embodiments, the node is a mobility management node, and initiating paging of the user terminal according to the second paging mode comprises sending a message to the base station, the message ordering the base station to page the user terminal according to the second paging mode. In other embodiments, the node is the base station, and initiating paging of the user terminal according to the second paging mode comprises transmitting one or more paging messages for the user terminal, using a message format corresponding to the second paging mode.

In some embodiments, an information element is included in a message sent from a Mobility Management Entity (MME) to the eNB ordering the eNB to page a UE. The information element indicates whether paging should be done in normal or extended mode, or both. Some embodiments include signaling from the UE or the eNB to the MME, indicating that the UE is in need of extended coverage mode.

In some embodiments the MME makes use of information about UE capabilities and/or of signaling received from the UE or eNB to define the mode in with paging is sent to eNBs in the tracking area and/or to define the order in which paging is sent according to different modes. In some of these and in other embodiments, a UE is required to monitor paging on normal control channel, extended coverage control channel, or both, dependent on received signal quality and/or dependent on signaling previously sent to the MME.

Corresponding apparatus embodiments adapted to carry out these techniques, i.e., user equipment/user terminal apparatus, base station (e.g., eNodeB) apparatus, and control node apparatus, follow directly from the above and are described in detail below. Of course, the techniques and apparatus described herein are not limited to the above-summarized features and advantages. Indeed, those skilled in the art will recognize additional features and advantages upon reading the following detailed description, and upon viewing the accompanying drawings.

DETAILED DESCRIPTION

In the discussion that follows, specific details of particular embodiments of the presently disclosed techniques and apparatus are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
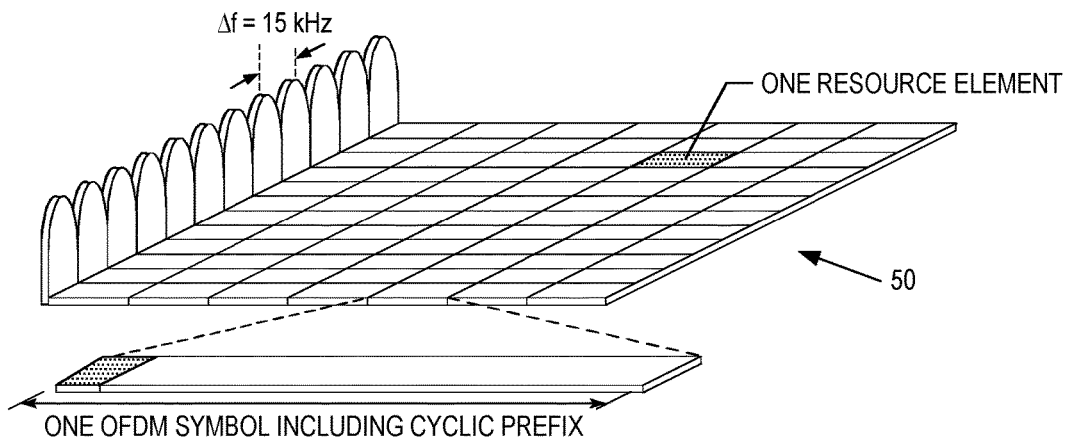
FIG. 1 illustrates the time-frequency resource grid of an OFDM signal.
Figure 2:
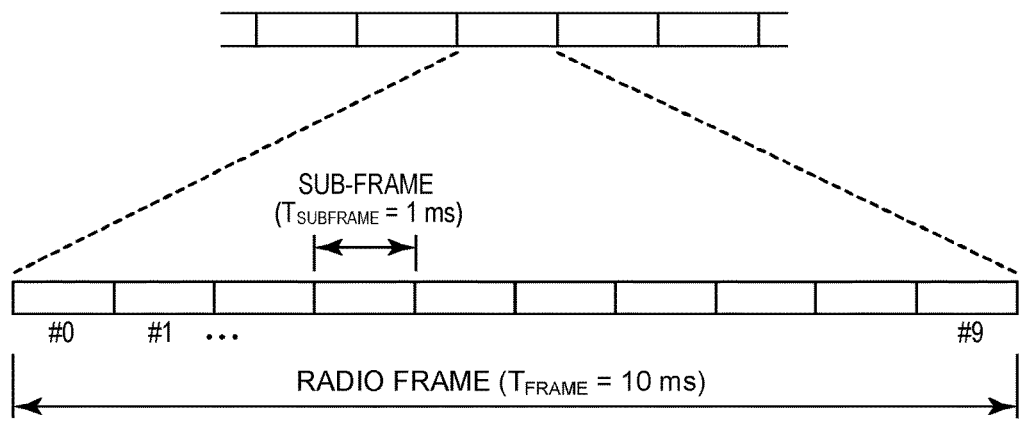
FIG. 2 is a time-domain representation of an LTE radio frame.
Figure 3:
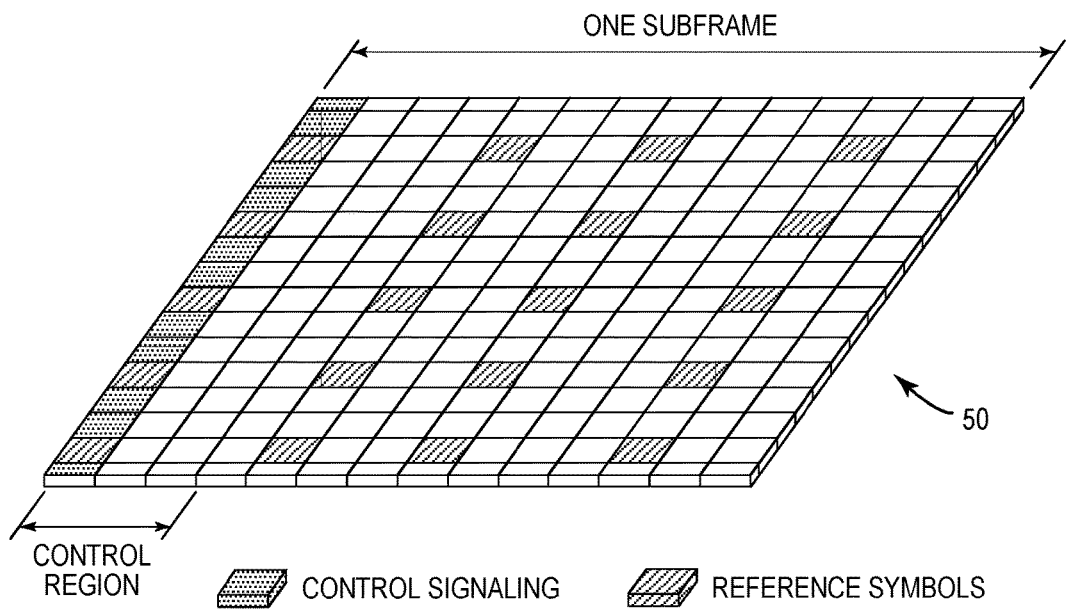
FIG. 3 illustrates details of an example subframe of an LTE signal.
Figure 4:
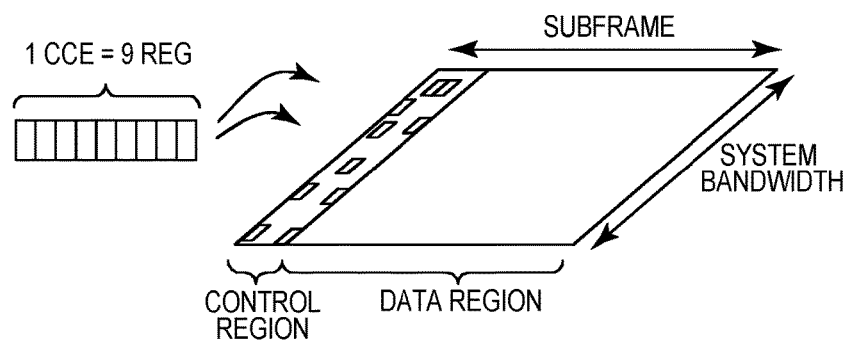
FIG. 4 illustrates the mapping of a CCE to the control region of an LTE subframe.
Figure 5:
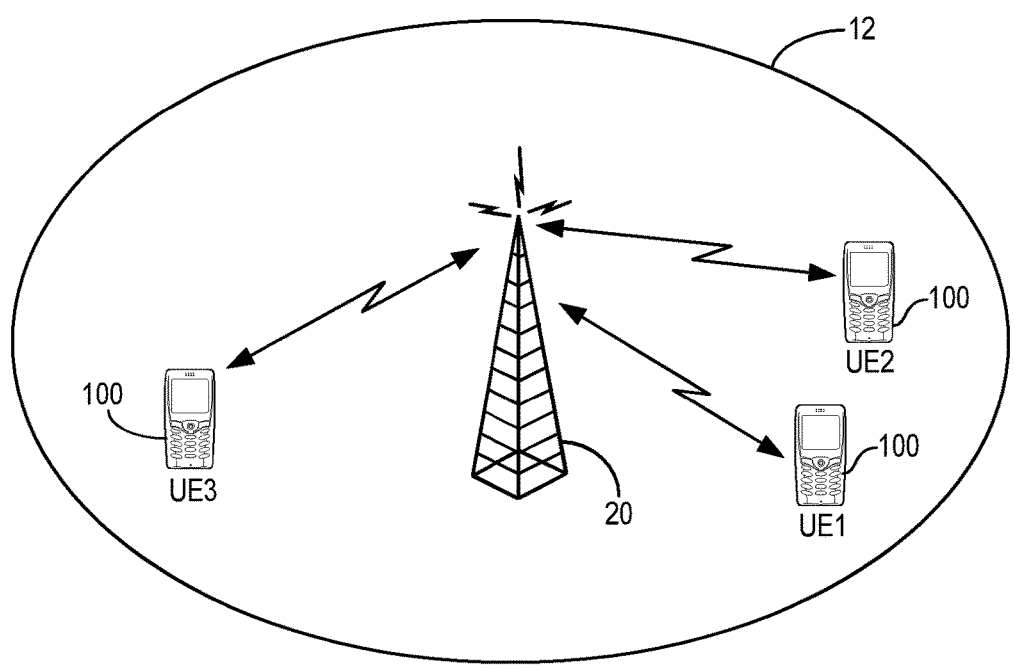
FIG. 5 illustrates an example radio communications network in which several of the presently disclosed techniques may be applied.

Referring now to the drawings, FIG. 5 illustrates an exemplary mobile communication network for providing wireless communication services to user terminals 100. Three user terminals 100, which are referred to as "user equipment" or "UE" in LTE terminology, are shown in FIG. 5. The user terminals 100 may comprise, for example, cellular telephones, personal digital assistants, smart phones, laptop computers, handheld computers, or other devices with wireless communication capabilities. It should be noted that the terms "user terminal," "mobile station," or "mobile terminal," as used herein, refer to a terminal operating in a mobile communication network and do not necessarily imply that the terminal itself is mobile or moveable. Thus, the terms should be understood as interchangeable for the purposes of this disclosure and may refer to terminals that are installed in fixed configurations, such as in certain machine-to-machine (M2M) or machine-type communication (MTC) applications, as well as to portable devices, devices installed in motor vehicles, etc.

The mobile communication network comprises a plurality of geographic cell areas or sectors 12. Each geographic cell area or sector 12 is served by a base station 20, which is generally referred to in LTE as an Evolved NodeB (eNodeB or eNB). One base station 20 may provide service in multiple geographic cell areas or sectors 12. The user terminals 100 receive signals from base station 20 on one or more downlink (DL) channels, and transmit signals to the base station 20 on one or more uplink (UL) channels. In particular, the UEs 100, whether in RRC_IDLE mode or RRC_CONNECTED mode, maintain synchronization to the illustrated base station 20, and monitor control channels transmitted by base station 20.

For illustrative purposes, many of the techniques and apparatus detailed below will be described in the context of a Long-Term Evolution (LTE) system. Those skilled in the art will appreciate, however, that the presently disclosed techniques may be more generally applicable to other wireless communication systems, including, for example, Wideband Code-Division Multiple Access (W-CDMA) systems, WiMax (IEEE 802.16) systems, or any other system that supports at least two paging modes, one paging mode providing extended coverage relative to the other, while consuming more resources. In LTE systems, for example, one paging mode might be based on pages carried by the PDCCH, while the other uses pages carried by the enhanced physical downlink control channel (EPDCCH) or other physical channel. Alternatively, pages might be carried on EPDCCH (or some other physical channel) in both modes, with one paging mode using substantially more redundancy than the other, so as to provide extended coverage. Other systems may use similar techniques, such as drastically increasing the redundancy in paging messages to provide a second, extended coverage, paging mode.

As discussed above, there are plans to introduce a new solution for "enhanced MTC coverage," with a target to improve the link budget by approximately 15-20 dB compared to what is supported with the legacy LTE standard. To achieve this, multiple physical channels and physical signals will need to be improved. More particularly, new signals and related procedures will likely need to be defined for this purpose.

Paging is used for the system to reach the UEs (User Equipment) in the event of network-initiated data transmissions or to inform a UE of system updates. A UE that is only able to obtain coverage in enhanced coverage mode will not be able to be reached by normal paging procedures. Thus, a new channel for paging is needed. As discussed in detail below, the overhead from paging in extended coverage mode will be larger than for normal paging procedures. Thus, it should be avoided when possible. Disclosed herein are techniques for determining when extended coverage paging is needed.

A likely outcome of the 3GPP work on enhanced coverage for MTC devices is a new set of signals and physical channels that are defined on top of the existing legacy LTE signals and physical channels. These will likely include a new control channel having an additional common search space.

MTC devices operating in extended coverage are likely to be stationary or close to it; otherwise they would not need extended coverage for very long. Many are also expected to be active for a relatively short fraction of the time. For example, a device might wake up once per hour to listen to the network. New paging cycles would hence be needed; this is currently discussed in the RAN2 working group of 3GPP. However, it is also possible that devices will operate with current paging cycles, even if the wake-up time to read a paging may be significantly longer.

In LTE-based systems, paging of a mobile device, below referred to as a UE (User Equipment), is initiated from the core network, and is typically triggered by arrival of downlink user data. The user data to be delivered is buffered in a Serving Gateway (SGW), which sends a Downlink Data Notification GTPv2-C message (specified in the GPRS Tunneling Protocol) to a Mobility Management Entity (MME). The MME checks to determine which base stations, below referred to as eNodeBs (eNBs), serve cells belonging to any of the Tracking Areas (TAs) whose Tracking Area Identities (TAIs) are included in the UE's current TAI list. The MME then sends a PAGING S1 Application Protocol (S1AP) message across the S1 interface to each of these eNBs, requesting the eNB to page the UE in all cells belonging to any of the concerned TAs, i.e. in all cells having a TAI that is included in the UE's list of TAIs. The PAGING S1AP message includes a UE identifier based on the International Mobile Subscriber Identity (IMSI) in the UE Identity Index Value Information Element (IE), the UE's list of TAIs in the List of TAIs IE, and a possible UE-specific Discontinuous Reception (DRX) cycle length in the Paging DRX IE.

Upon receiving the PAGING S1AP message from the MME, the eNB calculates the applicable paging occasions, awaits the next paging occasion and sends a Paging Radio Resource Control (RRC) message, indicated by a downlink resource assignment addressed to a paging Radio Network Temporary Identifier (RNTI) to the UE in the subframe corresponding to the paging occasion. This is sent on the Physical Downlink Control Channel (PDCCH). The eNB does this for each of its cells that take part in the paging procedure.

A UE that is only able to obtain coverage in extended coverage mode will not be able to be reached by normal paging procedures. Thus, a new channel for paging is needed. One possibility, in LTE networks, is to utilize the Enhanced Physical Downlink Control Channel (EPDCCH) for the extended coverage paging mode. Support in the standards for EPDCCH-based paging can be expected to happen for MTC terminals, since these devices may have small receive bandwidths compared to the signal bandwidths supported by the network and consequently cannot receive the legacy PDCCH channel, which extends over the full system bandwidth. Whether an extended coverage mode paging is provided via EPDCCH-based paging or some other technique, the overhead from paging in extended coverage mode will be larger than for normal paging procedures. Thus, it should be avoided when possible.

With existing solutions, a network would always have to page UEs using both normal mode and extended coverage mode, if implemented. There are also currently no rules for the UE to use to determine where to look for paging messages in a network supporting extended coverage.

Disclosed herein are techniques for determining when extended coverage paging is needed. In some embodiments of the disclosed techniques, the network selectively pages the UE using either normal mode paging or coverage extension mode paging, or both, depending on the expected UE need for coverage extension. The UE monitors for normal mode paging or coverage extension mode paging according to well defined rules.

In some embodiments, an information element is included in the message sent from a Mobility Management Entity (MME) to the eNB ordering the eNB to page a UE. The information element indicates whether paging should be done in normal or extended coverage mode, or both. Some embodiments include signaling from the UE or the eNB to the MME, indicating that the UE is in need of extended coverage mode.

In some embodiments the MME makes use of information about UE capabilities and/or of signaling received from the UE or eNB to define the mode in with paging is sent to eNBs in the tracking area and/or to define the order in which paging is sent according to different modes. In some of these and in other embodiments, a UE is required to monitor paging on normal control channel, extended coverage control channel, or both, dependent on received signal quality and/or dependent on signaling previously sent to the MME.

In the discussion that follows, several techniques for facilitating the efficient use of extended coverage paging are disclosed. For convenience, the description of these techniques is grouped into several sections entitled "Embodiment 1," "Embodiment 2," etc. It should be appreciated, however, that the techniques described therein may actually comprise several different embodiments of the described techniques, and that techniques from different sections may be combined with one another to form additional embodiments of the inventive techniques that are disclosed.

Embodiment 1: Paging Order Message

According to some embodiments of the presently disclosed techniques, new signaling is introduced in order to inform an eNodeB whether paging is to be sent out using "normal" or "extended" format. A "normal" format uses common search space on PDCCH with up to eight Control Channel Elements (CCEs) and coding on Physical Downlink Shared Channel (PDSCH) to reach the cell edge of the LTE Release-8 cell coverage. An "extended" format uses a newly defined search space or paging mechanism to reach a larger area than the "normal" format. It may use any of several techniques for coverage enhancement, for example a larger aggregation level on PDCCH, spreading the paging message over one or multiple subframes, and a more robust modulation and coding on the data channel, spread over one or multiple subframes.

In a LTE system, the new signaling to indicate whether the normal or extended paging format is to be used may be included as a new field in the PAGING S1AP message, for example. In the following, this field is a referred to as the PAGING_MODE.

In some embodiments, PAGING_MODE has two possible values: either normal or extended mode. In this case, the eNB responds to this field by paging the UE according to the indicated mode. In other embodiments, PAGING_MODE has three possible values: either normal, extended or "both". If "both" is indicated, then the eNodeB pages the UE in both modes, either in parallel or sequentially, e.g., first using normal mode and then using extended mode. The rationale for parallel use of normal and extended paging mode is to reach the UE as quickly as possible when the UE paging state/mode is not known, to the detriment of resource usage efficiency. For the case where only indication of either normal or extended (not "both") is supported, the eNB may in some embodiments receive two PAGING S1AP messages for the same UE Identity Value, having different values for PAGING_MODE, in which case the eNB may be configured to page the UE in both modes, again, either in parallel or sequentially.

In some embodiments, the eNB is configured to treat the absence of the PAGING_MODE field as an implicit indication that normal mode should be used. In these embodiments, the PAGING_MODE field is then only signaled when extended mode (or "both") should be used. In other embodiments, a missing PAGING_MODE field is interpreted as an implicit indication that "both" should be used.

In some embodiments, the message from the MME indicates only that the UE supports extended coverage mode, as indicated by capability signaling from the UE. In these embodiments, the eNodeB may then choose to always page in extended mode (if extended mode is active in the cell) or to first page in normal mode and then page in extended mode.

If an eNodeB supporting coverage extension mode receives a PAGING S1AP without the PAGING_MODE field, the eNodeB may still choose to page in both normal and extended mode. A missing PAGING_MODE field can be an indication that the MME does not support the extended coverage mode paging feature, or just that paging in both modes is required.

Embodiment 2: Indication of Coverage Extended Paging Need

According to some embodiments of the presently disclosed techniques, a UE signals to the MME an indication that it requires extended coverage mode paging to be reached in the current radio conditions. This signaling could be part of a tracking area update message, for example. The indication could also be included in a Connection Setup message sent when establishing a connection, or some other Non-Access Stratum (NAS) signaling message.

In some embodiments, the UE is required to make a tracking area update when moving from an area where normal paging is likely to reach the UE to an area where the UE is only reachable with extended coverage paging. In some embodiments, the UE is also required to make a tracking area update when moving back into an area where normal paging is sufficient. In some embodiments, such a tracking area update is only required once the UE has been in (or out) of normal paging coverage for a predefined period of time. In some embodiments, the definition of being in a normal paging coverage area is based on an expected Block-Error Rate (BLER) on PDCCH, or other measures of the downlink link quality, such as received signal strength or quality. In some embodiments, that the UE is in a normal paging coverage area is defined as equivalent to the UE's need for a certain degree of extended coverage for other services, such as PDSCH traffic. However, due to the actual differences in link budget between different channels and services, there may be different trigger points for when paging in extended coverage mode is required and when coverage enhancements are required for other services.

In some embodiments, it is instead the eNB that signals an indication of a need for coverage extension mode paging to the MME. This could be done using an existing or a new S1AP signaling message, for example. This indication could be sent at UE connection set-up based on the access scheme used by the UE. It could in some embodiments be sent at connection release, using the UE Context Release message.

The network node may detect the need for this specific paging mode in different ways, e.g., upon reception of a specific "coverage enhancement" mode Physical Random Access Channel (PRACH) preamble, or upon a specific RRC Connection Setup indicating that the UE is in need of coverage enhancement. It could also be triggered by the link quality or the need for extended coverage for other services, as elaborated above.

Alternatively, the network node (eNB or relay node) in some embodiments detects a need for coverage extension mode paging by observing that a UE requires more than N consecutive normal paging attempts before it responds (or doesn't respond at all), where N is a threshold that can be fixed in the standard or a cell configuration parameter. In such a case, the network node (eNB or relay node) signals the need for coverage extension mode paging to the MME.

In the detection mechanisms described here, the radio network node (eNB or relay node) is aware of the IMSI of the UE. During NAS connection establishment, the UE has transmitted its IMSI to the MME. Once it is detected that this specific UE needs coverage enhancement, then the MME stores this information and uses it for future S-TMSI (SAE Temporary Mobile Subscriber Identity) allocations.

Embodiment 3: MME Control of Extended Coverage

In some embodiments of the presently disclosed techniques, a paging is triggered in the MME, for example by arrival of downlink user data. In some of these embodiments, the MME looks up stored information about the capability of the device associated with the UE identity, e.g., the last device using the identity. The MME determines what mode to indicate in the PAGING_MODE field, the presence of the field, and to what eNB(s) the MME should send the PAGING message, based on whether stored information exists and, if it exists, what is supported by the device.

In some embodiments, the MME looks up stored information that indicates the UE need for extended mode coverage, which stored information may have been previously signaled to the MME according to one or more of the techniques described above, for "Embodiment 2." What mode and which eNB(s) to send the PAGING message in this case may depend on whether a need for coverage extension mode has been signaled from UE/eNB to the MME or not. It may also depend on how long ago the signaling was received.

In one example of these embodiments a MME may decide to use a particular paging order for carrying out paging operations, based on the stored information or lack thereof. The MME then sends paging messages to eNB according to the paging order, with a delay between each level of attempts. Examples are given below.

In one example, where the UE did not report need of extended coverage, or the UE has not signaled support of coverage enhancements, the levels are:
1. Last serving eNB, normal paging (if known)
2. All eNB in tracking area or tracking area group, normal paging
3. Last serving eNB, extended paging
4. All eNB in tracking area or tracking area group, extended paging The same MME may, if indication of extended coverage is received, instead use:
1. Last serving eNB, normal and extended paging
2. All eNB in tracking area or tracking area group, normal paging
3. All eNB in tracking area or tracking area group, extended paging These are only examples of levels; an MME may divide into further levels within a tracking area or tracking area group. It may also apply some levels in different order, or on the same level.

In the above examples, new paging messages are sent from the MME to the eNB(s) for each level of attempts. In alternative embodiments, additional signaling between the MME and the eNB, or some predefined rules, is introduced to describe rules for how different levels of attempts are to be executed by the eNB(s), and then a new paging message does not have to be sent to the eNB(s) for each level. Such signaling may also include desired delays and other parameters.

Embodiment 4: Paging Monitoring

In some embodiments of the presently disclosed techniques the UE is required to selectively monitor for paging on the normal control channel or using extended coverage paging procedure. The method to use at a given time may be dependent on downlink received signal strength; it may also depend on an estimated error probability on the normal paging channel.

In some embodiments, the UE is required to always monitor paging according to extended coverage paging procedure. In other embodiments, the UE is only required to monitor extended coverage paging procedure if extended coverage mode has been signaled to the MME and if the UE is still camping on the same cell.

In some embodiments, the UE is required to monitor for both normal paging and enhanced coverage paging. This can be mandatory UE behavior in cells supporting enhanced coverage paging or it can be mandatory UE behavior for a UE that has used enhanced coverage mode during at least the last X seconds where X is a threshold that may be fixed in the standard or a configuration parameter. In this case, the UE may respond to the paging by indicating the paging mode, the UE has responded to.

Embodiment 5: Signaling of Coverage Extension Capability

In order for the coverage extension paging functionality to work in the best ways as described above, it is necessary that the UE and all involved network nodes are capable of handling this functionality. If one of the network nodes, say the eNB or the MME, is compliant with an earlier release of the standard, or for other reasons is not capable of handling the coverage extension functionality, it may be beneficial if the other involved nodes are aware of this, and may adjust their behavior accordingly.

Therefore, in one embodiment, new S1AP signaling is introduced between an eNB and an MME with an information element indicating that coverage extension modes are supported. Upon successful reception of such signaling, the network node knows that the other node will handle the devices requiring coverage extension in a specific manner, for example as outlined in the embodiments above. If, on the other hand, one of the network nodes fails to detect the other node's coverage extension capability, it may adjust its own behavior.

The signaling of capability does not need to be explicit. In some embodiments, a missing field, such as PAGING_MODE discussed above, can be used as an indication that the other node does not support coverage extension.

As one example of a modified behavior, mentioned above in Embodiment 1, if the MME does not support coverage extension, an eNB may detect this and may choose to page both in normal and extended mode. Similarly, if an MME detects that a particular eNB does not support coverage extension, it may adjust its behavior, for example by changing the rules for how the different levels of paging attempts in Embodiment 3 above are applied.

In another embodiment, coverage extension capability is signaled from the MME to the UE, typically using some NAS signaling message. An indication of whether the MME supports extended paging may affect how the UE is required to monitor for paging using normal and/or extended paging, as discussed in Embodiment 4 above.

Figure 6:
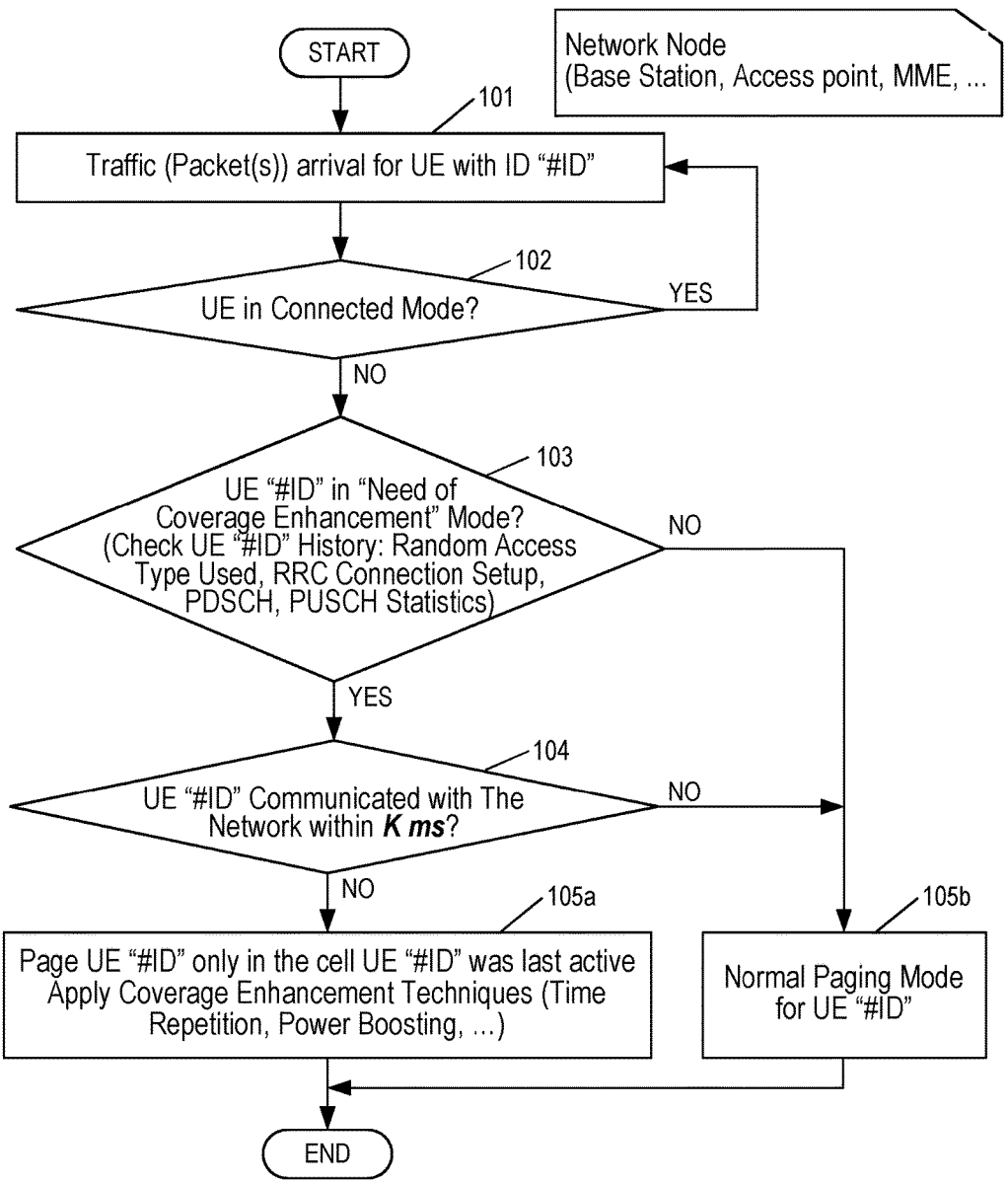
FIG. 6 is a process flow diagram illustrating example MME behavior according to several of the disclosed embodiments.

FIG. 6 presents an example of a system featuring embodiments 1-5. In this example, which illustrates a method carried out by one or more network nodes, such as a base station or other access point, and/or a control node such as an MME, it is assumed that the network is aware that the UE to be paged supports coverage enhancement. This knowledge can be provided according to any of the techniques discussed above. As shown at block 101, the method is triggered by the arrival at the network node of packets targeted to a particular UE, identified by #ID. As shown at block 102, the network determines whether a page is needed—if the UE is already in connected mode then no paging is necessary. In step 103, the information whether a UE needs coverage enhancement paging is retrieved, based on UE connection history, as exemplified in embodiment 2. In step 104, it is evaluated whether this information is up to date, namely whether the UE was connected with the network within the last K milliseconds, where K is a threshold that may be fixed in the standard or that may be a configuration parameter. If so, coverage enhancement paging is used directly, as shown at block 105A. Otherwise normal paging is attempted first, as shown at block 105B.

Figure 7:
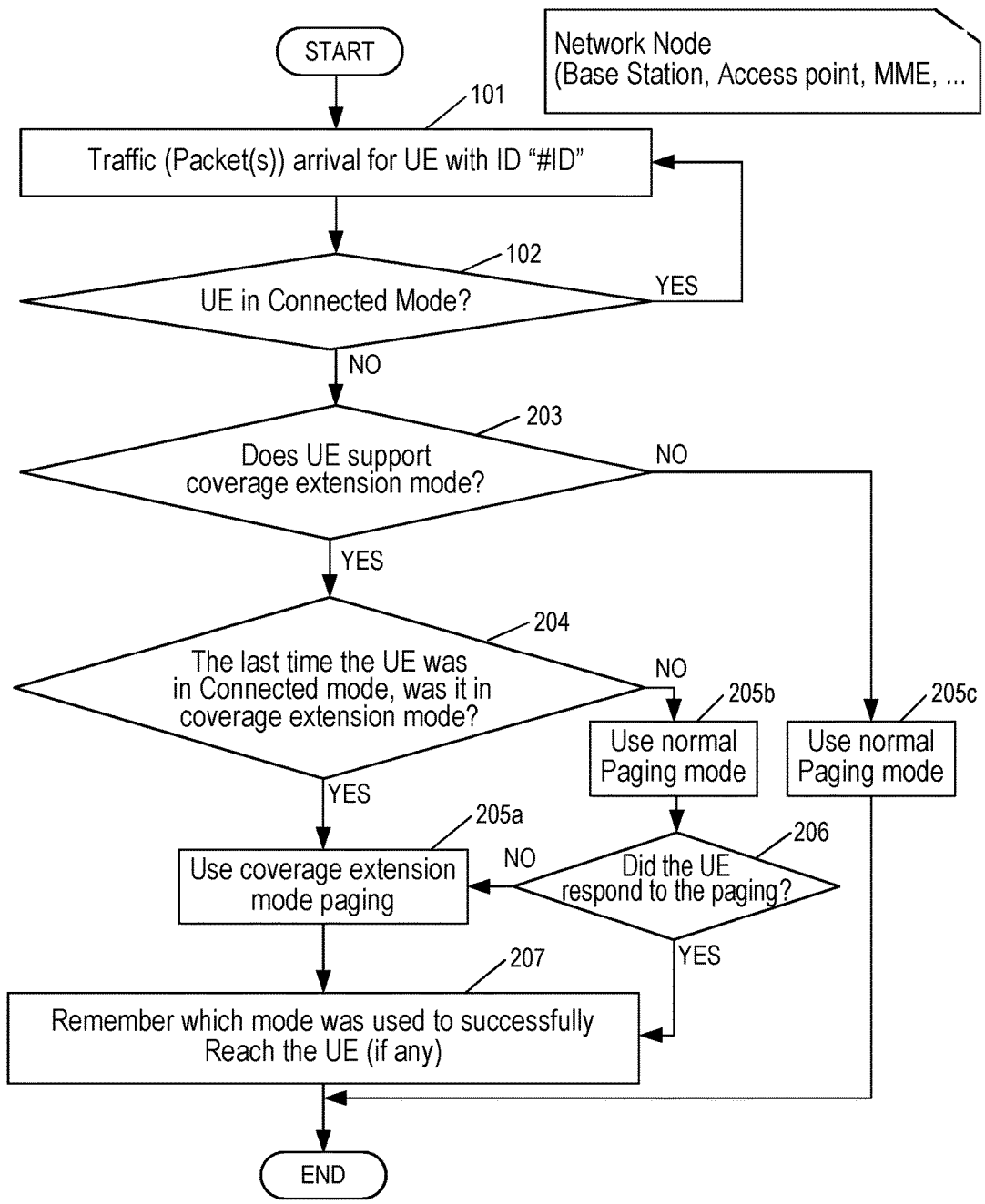
FIG. 7 is another process flow diagram illustrating example MME behavior according to several of the disclosed embodiments.

FIG. 7 shows another example of a system/node executing a method as described in embodiments 1, 2, 4 & 5. In this example, it is assumed that the network is aware of the UE capability in supporting paging in coverage extension mode, as seen at block 203. If a given UE does not support paging in coverage extension mode, then normal mode paging only is used, as shown at block 205C. In the illustrated technique, the system/node determines whether the UE was in a coverage extension mode the last time it was in connected mode, as shown at block 204—if so, coverage extension mode paging is used. This test may be conditioned by an evaluation of whether the latest information is current enough. For example, the system may evaluate whether the UE was in a coverage extension mode within the last T seconds, in some embodiments.

As an extension to the example of FIG. 6, in this example process flow, blocks 205B and 206 illustrate what happens when an UE previously paged by using the "normal" paging mode is paged now again with this "normal" paging mode, but the UE has moved to an area of limited or no coverage, so that the UE fails to respond to the paging. In this case, the "extended" paging mode is needed, as shown at block 205A. Note that the system remembers (e.g., by storing data) which paging mode was used to successful in reaching the UE (if any), as shown at block 207.

FIGS. 6 and 7 complement each other in the sense that in FIG. 7 the time difference between the previous and the current paging occasions is not checked, as is the case for FIG. 6. On the other hand, FIG. 6 focuses only on the use of the "extended" paging mode, without considering the switch from normal to "extended" paging mode and vice versa. It will be appreciated that combinations and variations of these techniques may be used, in various implementations.

Figure 8:
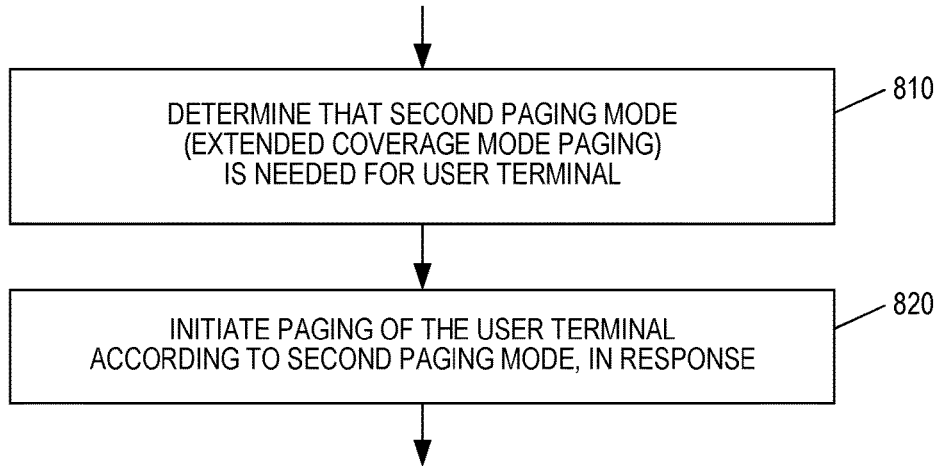
FIG. 8 is a process flow diagram illustrating an example method for implementation in a base station or in a control node such as an MME.
Figure 9:
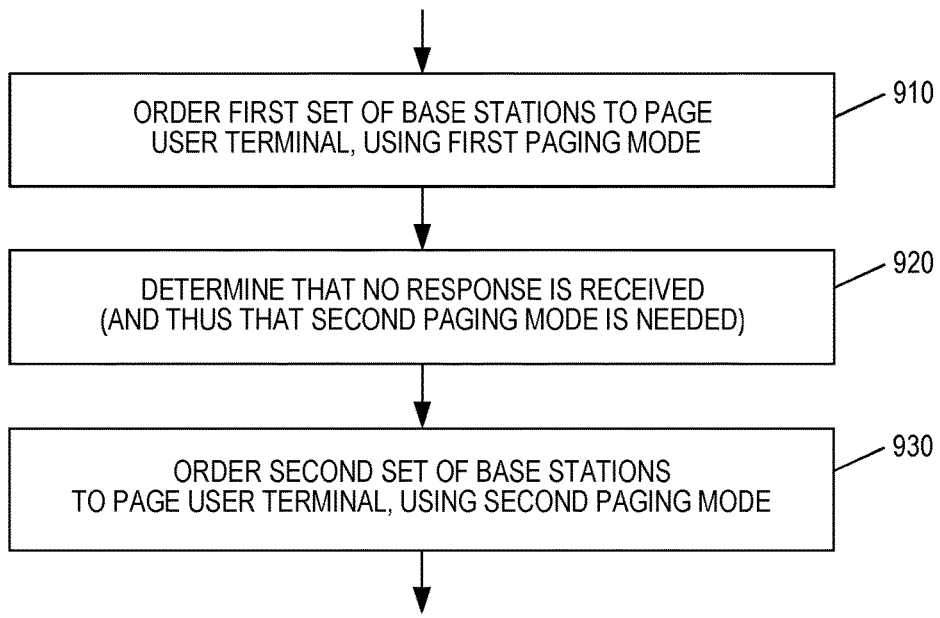
FIG. 9 is a process flow diagram illustrating an example method for implementation in a control node, such as an MME.
Figure 10:
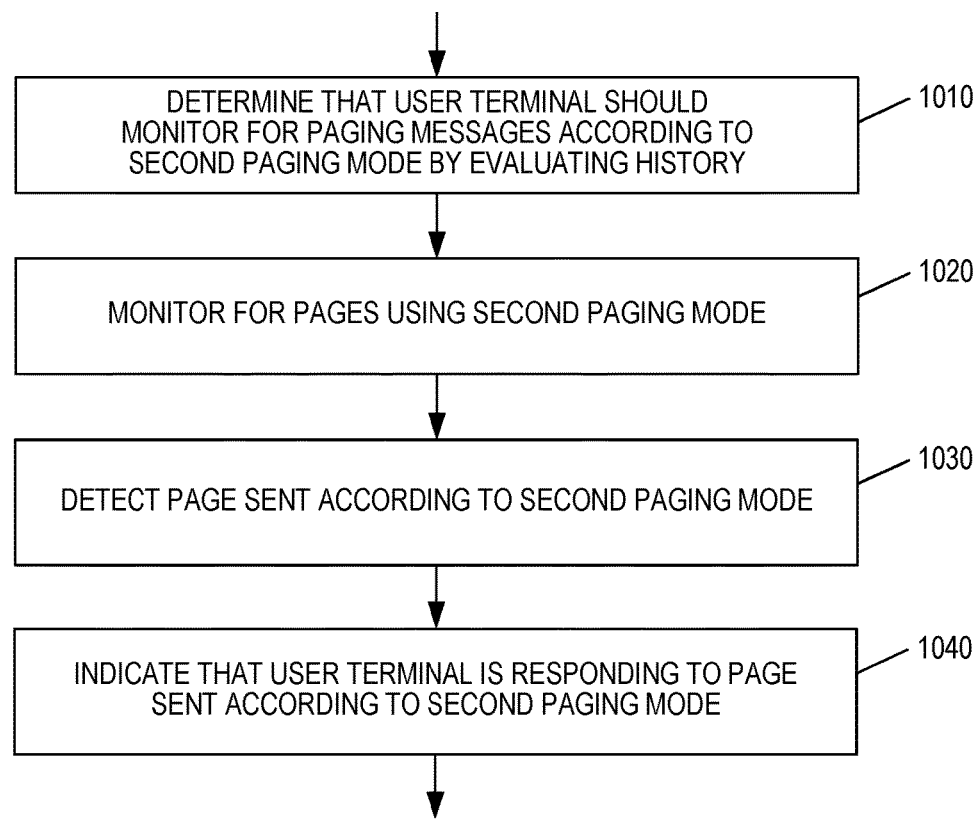
FIG. 10 is a process flow diagram illustrating an example method for implementation in a user terminal.

In view of the several techniques detailed above, it will be appreciated that FIGS. 8, 9, and 10 are process flow diagrams illustrating example methods for supporting paging of user terminals by a base station that supports first and second paging modes, where the second paging mode provides extended coverage relative to the first paging mode and uses more resources than the first paging mode. The method illustrated in FIG. 8 may be implemented in either a base station (e.g., an LTE eNB) or in a mobility management node (e.g., an LTE MME), while the method shown in FIG. 9 is suitable for implementation in a mobility management node. The method shown in FIG. 10 may be implemented in a user terminal that supports the receipt of pages in the first and second paging modes.

Turning first to FIG. 8, the illustrated method includes determining that the second paging mode is needed for a user terminal, as shown at block 810. This may be done in any of several ways. For example, the node may receive, from the user terminal, an indication that coverage-extension paging is needed for the user terminal. This indication may be received as part of a tracking area update message, for example, or as part of some other message sent by the user terminal. In other embodiments, the node may receive an indication that coverage-extension paging is needed for the user terminal from a base station. When determining whether or not the second paging mode is needed, the node may consider the age of the indication, in some embodiments. In some of these and in some other embodiments, the node may also evaluate a capability indicator for the user terminal, which capability indicator indicates whether or not the user terminal is able to receive paging according to the second paging mode.

In some other embodiments, determining whether the second paging mode is needed for the user terminal may comprise evaluating a connection history for the user terminal by determining whether a length of time since the user terminal was last connected to the network is less than a time interval determined by a threshold parameter. In other embodiments, the node may evaluate whether the user terminal was in a coverage extension mode when it was most recently connected and, if so, determine that the second paging mode is needed. In still other embodiments or instances, the node may determine that the second paging mode is needed by determining that no response has been received, within a predetermined time or times, for one or more paging messages sent to the user terminal according to the first paging mode The method shown in FIG. 8 also includes initiating paging of the user terminal according to the second paging mode, as shown at block 820, in response to determining that the second paging mode is needed for the user terminal. In some embodiments, the node carrying out the method of FIG. 8 is the base station, in which case initiating paging of the user terminal according to the second paging mode comprises transmitting one or more paging messages for the user terminal, using a message format corresponding to the second paging mode.

In other embodiments, the node carrying out the illustrated method is a mobility management node, in which case initiating paging of the user terminal according to the second paging mode may comprise sending a message to the base station, the message ordering the base station to page the user terminal according to the second paging mode. In some embodiments, the message orders the base station to page the user terminal according to both the first paging mode and the second paging mode. In other embodiments, the message orders the base station to first page the user terminal according to the first paging mode and to then page the user terminal according to the second paging mode in the event that paging the user terminal according to the first paging mode is unsuccessful.

FIG. 9 illustrates a somewhat more detailed version of the method shown in FIG. 8, as might be carried out by a mobility management node. As shown at block 910, the node orders a first set of base stations to page the user terminal according to the first paging mode. As shown at block 920, the node subsequently determines that no response has been received, within a predetermined time or times, for pages sent according to the first paging mode, and thus determines that the second paging mode is needed. Accordingly, as shown at block 930, the node initiates paging of the user terminal according to the second mode by ordering a second set of base stations to page the user terminal according to the second paging mode. The second set of base stations may cover a wider area, for example.

FIG. 10 illustrates an example method for implementation in a user terminal that supports first and second paging modes, where the second paging mode provides extended coverage relative to the first paging mode but uses more resources than the first paging mode. As shown at block 1010, the user terminal determines that it should monitor for paging messages according to the second paging mode by evaluating an operational history for the user terminal with respect to operation in a coverage extension mode. This may be done, for example, by determining that the user terminal has used the coverage extension mode within an immediately preceding interval of time defined by a predetermined threshold value. As another example, this may be done by determining that the user terminal used the coverage extension mode when most recently operating in the current cell.

As shown at block 1020, the method further includes monitoring for paging messages according to the second paging mode, in response to the determining shown in block 1010. In some instances, as shown at block 1030, the user terminal will detect a page sent according to second paging mode. In some embodiments, the user terminal, when responding to the page, may explicitly indicate that the user terminal is responding to a page sent according to the second paging mode, as shown at block 1040, so that the network is informed that the second paging mode was needed and may be needed in the future.

Figure 11:
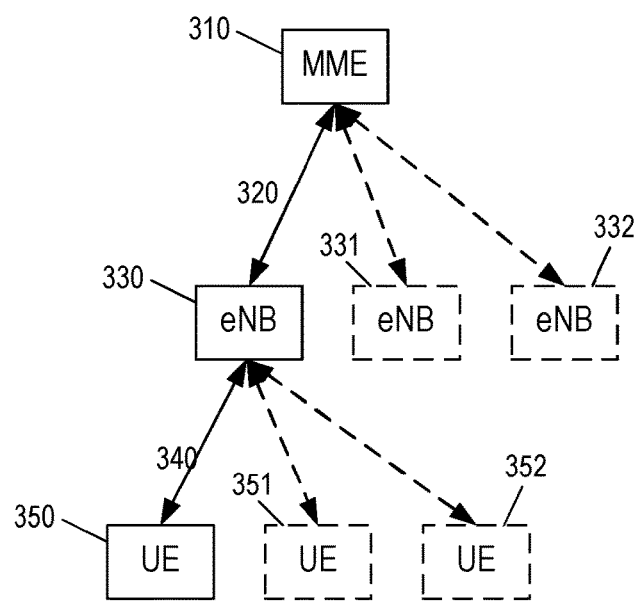
FIG. 11 illustrates an example system architecture.

FIG. 11 depicts an example system architecture in which the techniques described herein may be applied. Node 310 represents the Mobility Management Entity, MME, which communicates with eNBs 330, 332 over the S1 interface 320. The eNB 330 communicates with UEs 350, 352 over the radio interface 340, also denoted Uu. When the network wants to page a UE 350 it sends a Paging S1AP message to one or more eNBs, in particular the eNB the UE 350 was previously connected to. The eNBs receiving the paging message then pages the UE in the proper radio subframe over the radio interface.

It will be appreciated that apparatus adapted to carry out the methods described above, i.e., user equipment/user terminal apparatus, base station (e.g., eNodeB) apparatus, and mobility management/control node apparatus, follow directly from the above-described methods. More particularly, it will be appreciated that the functions in the techniques and methods described above may be implemented using electronic data processing circuitry provided in user terminals, base stations, and other nodes in a radio communication network. Each user terminal and base station, of course, also includes suitable radio circuitry for receiving and transmitting radio signals formatted in accordance with known formats and protocols, e.g., LTE formats and protocols.

Figure 12:
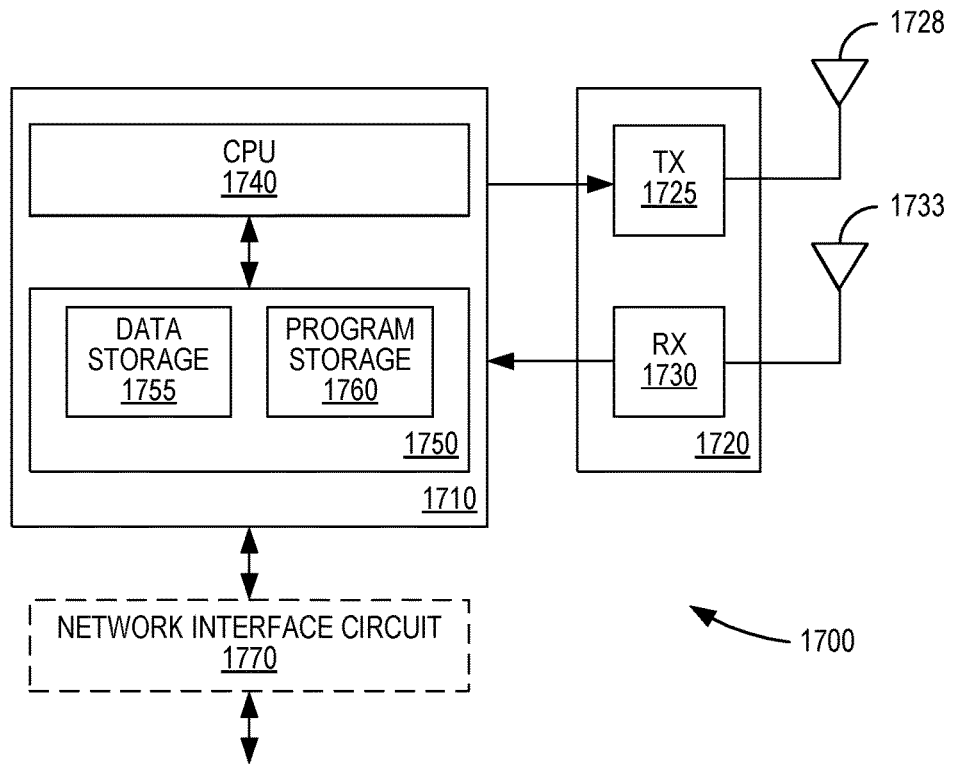
FIG. 12 is a block diagram illustrating components of an example communications node.

FIG. 12 illustrates features of an example communications node 1700 according to several embodiments of the presently disclosed techniques. Although the detailed configuration, as well as features such as physical size, power requirements, etc., will vary, the general characteristics of the elements of communications node 1700 are common to both a wireless base station and a user terminal. Either may be adapted to carry out one or several of the techniques described above for facilitating the paging of UEs in an extended coverage mode in a radio communications network.

Communications node 1700 comprises a transceiver 1720 for communicating with mobile terminals (in the case of a base station) or with one or more base stations (in the case of a mobile terminal) as well as a processing circuit 1710 for processing the signals transmitted and received by the transceiver 1720. Transceiver 1720 includes a transmitter 1725 coupled to one or more transmit antennas 1728 and receiver 1730 coupled to one or more receive antennas 1733. The same antenna(s) 1728 and 1733 may be used for both transmission and reception. Receiver 1730 and transmitter 1725 use known radio processing and signal processing components and techniques, typically according to a particular telecommunications standard such as the 3GPP standards for LTE and/or LTE-Advanced. In the event that communications node 1700 is a base station, it may further comprise a network interface circuit 1770, which network interface circuit 1770 is adapted to communicate with other network nodes, such as an MME or other control node, using industry-defined protocols such as the S1 interface defined by 3GPP. Because the various details and engineering trade-offs associated with the design and implementation of transceiver circuitry, processing circuitry, and network interface circuitry are well known and are unnecessary to a full understanding of the presently disclosed techniques and apparatus, additional details are not shown here.

Processing circuit 1710 comprises one or more processors 1740, hardware, firmware or a combination thereof, coupled to one or more memory devices 1750 that make up a data storage memory 1755 and a program storage memory 1760. Memory 1750 may comprise one or several types of memory such as read-only memory (ROM), random-access memory, cache memory, flash memory devices, optical storage devices, etc. Again, because the various details and engineering trade-offs associated with the design of baseband processing circuitry for mobile devices and wireless base stations are well known and are unnecessary to a full understanding of the presently disclosed techniques and apparatus, additional details are not shown here. Typical functions of the processing circuit 1710 include modulation and coding of transmitted signals and the demodulation and decoding of received signals. In several embodiments, processing circuit 1710 is adapted, using suitable program code stored in program storage memory 1760, for example, to carry out one or several of the techniques described above. Of course, it will be appreciated that not all of the steps of these techniques are necessarily performed in a single microprocessor or even in a single module. Thus, embodiments of the presently disclosed techniques include computer program products for application in a user terminal as well as corresponding computer program products for application in a base station apparatus.

Figure 13:
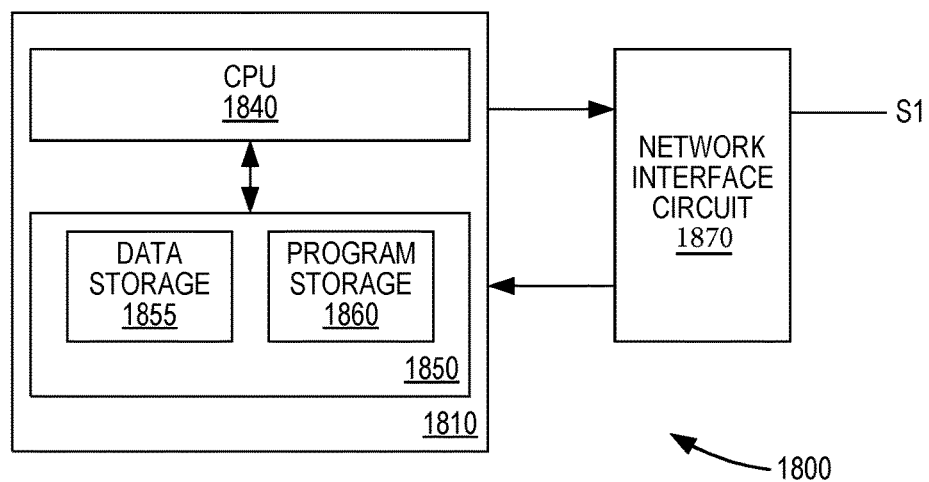
FIG. 13 is a block diagram illustrating components of an example control node.

Similarly, FIG. 13 illustrates features of a control node 1800, adapted to carry out one or more of the techniques described above. Control node 1800 may be a mobility management node, for example. Control node 1800 includes a network interface circuit 1870, which is adapted to communicate with other elements of the wireless network, such as one or more eNBs, according to one or more of well-known specifications for network communication. In an LTE context, for example, network interface 1870 is configured to communicate via the S1 interface defined by the LTE specifications. This communication may include, in various embodiments, signaling according to one or more of the techniques described above, to support the transmission of broadcast messages, including paging messages.

Control node 1800, which might be, for example, an LTE MME, includes processing circuitry 1810, which in turn includes a CPU 1840 and memory 1850, which comprises a data storage memory 1855 and a program storage memory 1860. Memory 1850 may comprise one or several types of memory such as read-only memory (ROM), random-access memory, cache memory, flash memory devices, optical storage devices, etc. Again, because the various details and engineering trade-offs associated with the design of processing circuitry for radio network nodes are well known and are unnecessary to a full understanding of the presently disclosed techniques and apparatus, additional details are not shown here.

In several embodiments, processing circuit 1810 is adapted, using suitable program code stored in program storage memory 1860, for example, to carry out one or several of the techniques described above for a control node, such as an MME. Of course, it will be appreciated that not all of the steps of these techniques are necessarily performed in a single microprocessor or even in a single module. Thus, embodiments of the presently disclosed techniques include computer program products for application in a user terminal as well as corresponding computer program products for application in a base station apparatus.

Figure 14:
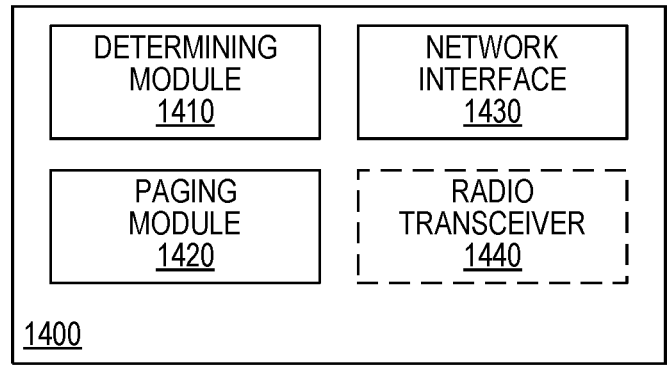
FIG. 14 is a block diagram illustrating functional modules in an example network node.
Figure 15:
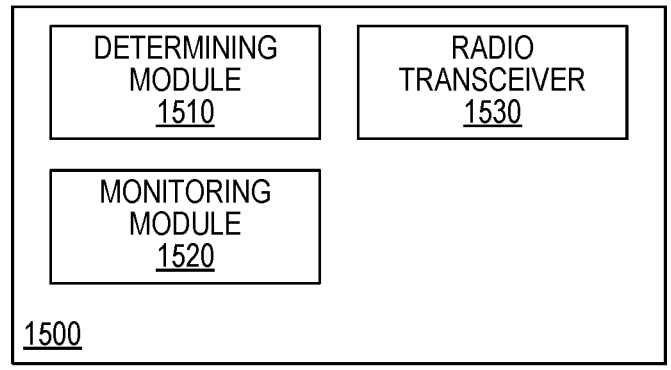
FIG. 15 is a block diagram illustrating functional modules in an example user terminal.

It will further be appreciated that various aspects of the above-described embodiments can be understood as being carried out by functional "modules," which may be program instructions executing on an appropriate processor circuit, hard-coded digital circuitry and/or analog circuitry, or appropriate combinations thereof. FIGS. 14 and 15 thus illustrate an example network node 1400 and user terminal 1500, respectively, where the details of the circuit are represented as functional modules. It will be appreciated that node 1400 and user terminal 1500 may be implemented using a hardware architecture similar to that of FIG. 13, in some embodiments.

FIG. 14 thus illustrates an example network node 1400 comprising a determining module 1410 configured to determine whether the second paging mode is needed for a user terminal and a paging module 1420 configure to initiate paging of the user terminal according to the second paging mode, in response to determining that the second paging mode is needed. Node 1400 further includes a network interface circuit 1430 configured to communicate with one or more other nodes in the wireless communication network. If node 1400 is an LTE base station, for example, the network interface circuit 1430 may comprise circuitry configured to communicate with one or more MMEs, SGWs, etc., using defined interfaces such as the S1 interface. Furthermore, if node 1400 is a base station, it will also include a radio transceiver circuit 1440, which is configured to communicate with one or more user terminals. Likewise, if node 1400 is an LTE MME, the network interface circuit 1430 comprises circuitry configured to communicate with one or more eNBs, over the S1. Other interfaces to other network nodes may also be supported, in both of these examples.

Similarly, user terminal 1500, as shown in FIG. 15, includes a determining module 1510 configured to determine that the user terminal 1500 should monitor for paging messages according to the second paging mode by evaluating an operational history for the user terminal with respect to operation in a coverage extension mode, and further includes a monitoring module 1520 configured to monitor for paging messages according to the second paging mode, responsive to said determining. User terminal 1500 further includes a radio transceiver 1530 configured to communicate with one or more base stations.

It will be appreciated that the node 1400 and user terminal 1500 shown in FIGS. 14 and 15, respectively, may be adapted according to any of the various techniques described above and illustrated in the process flow diagrams of FIGS. 6-10.

The techniques and apparatus disclosed above can provide a number of advantages, in various embodiments, including that paging overhead can be limited even if extended coverage for paging is introduced.

It will be appreciated by the person of skill in the art that various modifications may be made to the above described embodiments without departing from the scope of the presently disclosed techniques and apparatus. For example, it will be readily appreciated that although the above embodiments are described with reference to parts of a 3GPP network, embodiments will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments have been described in detail above, with reference to the attached illustrations of specific embodiments. Because it is not possible, of course, to describe every conceivable combination of components or techniques, those skilled in the art will appreciate that the present techniques and apparatus can be implemented in other ways than those specifically set forth herein, without departing from their essential characteristics. The present embodiments are thus to be considered in all respects as illustrative and not restrictive.

With these and other variations and extensions in mind, those skilled in the art will appreciate that the foregoing description and the accompanying drawings represent non-limiting examples of the systems and apparatus taught herein for supporting the transmission of broadcast messages, especially paging messages, in wireless communications networks. As such, the presently disclosed techniques and apparatus are not limited by the foregoing description and accompanying drawings, but are limited only by the following claims and their legal equivalents.

What is claimed is:

1. A method, in a node of a wireless communication network, for supporting paging of user terminals by a base station that supports first and second paging modes, the second paging mode providing extended coverage relative to the first paging mode and using more resources than the first paging mode, the method comprising:
   determining that the second paging mode is needed for a user terminal, wherein determining that the second paging mode is needed for the user terminal comprises receiving a message ordering the base station to page the user terminal according to the second paging mode; and
   initiating paging of the user terminal according to the second paging mode, in response to said determining, wherein initiating paging of the user terminal according to the second paging mode comprises transmitting one or more paging messages for the user terminal, using a message format corresponding to the second paging mode, and wherein the message orders the base station to first page the user terminal according to the first paging mode and to then page the user terminal according to the second paging mode in the event that paging the user terminal according to the first paging mode is unsuccessful.

2. The method of claim 1, wherein determining that the second paging mode is needed for the user terminal is triggered by an arrival of data to be transmitted to the user terminal.

3. The method of claim 1, wherein determining that the second paging mode is needed for the user terminal comprises receiving, from the user terminal, an indication that coverage-extension paging is needed for the user terminal.

4. The method of claim 3, wherein the indication is received as part of a tracking area update message.

5. The method of claim 3, wherein determining that the second paging mode is needed for the user terminal further comprises evaluating a time period since receiving the indication.

6. The method of claim 1, wherein determining that the second paging mode is needed for the user terminal comprises evaluating a capability indicator for the user terminal, the capability indicator indicating that the user terminal is capable of receiving pages according to the second paging mode.

7. The method of claim 1, wherein determining that the second paging mode is needed for the user terminal comprises evaluating a connection history for the user terminal.

8. The method of claim 7, wherein evaluating a connection history for the user terminal comprises determining that a length of time since the user terminal was last connected to the network is less than a time interval determined by a threshold parameter.

9. The method of claim 1, wherein determining that the second paging mode is needed for the user terminal comprises determining that the user terminal was in a coverage extension mode when it was most recently connected.

10. The method of claim 1, wherein determining that the second paging mode is needed for the user terminal comprises determining that no response has been received, within a predetermined time or times, for one or more paging messages sent to the user terminal according to the first paging mode.

11. The method of claim 1, wherein the node is a mobility management node and wherein initiating paging of the user terminal according to the second paging mode comprises sending a message to the base station, the message ordering the base station to page the user terminal according to the second paging mode.

12. A node, for use in a node of a wireless communication network, wherein the node is configured to support paging of user terminals by a base station that supports first and second paging modes, the second paging mode providing extended coverage relative to the first paging mode and using more resources than the first paging mode, the node comprising:
  interface circuitry; and
  processing circuitry configured to:
    determine that the second paging mode is needed for a user terminal, wherein determining that the second paging mode is needed for the user terminal comprises a step of receiving a message ordering the base station to page the user terminal according to the second paging mode, and
    responsive to the determination, initiate, via the interface circuitry, paging of the user terminal according to the second paging mode, wherein initiating paging of the user terminal according to the second paging mode comprises a step of transmitting one or more paging messages for the user terminal, using a message format corresponding to the second paging mode, and wherein the message orders the base station to first page the user terminal according to the first paging mode and to then page the user terminal according to the second paging mode in the event that paging the user terminal according to the first paging mode is unsuccessful.

13. The node of claim 12, wherein the processing circuitry is configured to determine that the second paging mode is needed for the user terminal in response to an arrival of data to be transmitted to the user terminal.

14. The node of claim 12, wherein the processing circuitry is configured to receive, from the user terminal, an indication that coverage-extension paging is needed for the user terminal, and to determine that the second paging mode is needed for the user terminal, based on the received indication.

15. The node of claim 14, wherein the indication is received as part of a tracking area update message.

16. The node of claim 14, wherein the processing circuitry is configured to evaluate a time period subsequent to receiving the indication and to perform determining based on the evaluation.

17. The node of claim 14, wherein the processing circuitry is configured to evaluate a capability indicator for the user terminal, the capability indicator indicating that the user terminal is capable of receiving pages according to the second paging mode, and to perform determining based on the evaluation.

18. The node of claim 14, wherein the processing circuitry is configured to evaluate a connection history for the user terminal and to perform determining based on the evaluation.

19. The node of claim 18, wherein the processing circuitry is configured to evaluate a connection history for the user terminal by determining that a length of time since the user terminal was last connected to the network is less than a time interval determined by a threshold parameter.

20. The node of claim 14, wherein the processing circuitry is configured to determine that the user terminal was in a coverage extension mode when it was most recently connected.

21. The node of claim 14, wherein the processing circuitry is configured to determine that the second paging mode is needed for the user terminal by determining that no response has been received, within a predetermined time or times, for one or more paging messages sent to the user terminal according to the first paging mode.

22. The node of claim 14, wherein the node is a mobility management node and wherein the processing circuitry is configured to perform initiating by sending a message to the base station, the message ordering the base station to page the user terminal according to the second paging mode.

23. A non-transitory computer-readable medium storing a computer program comprising program instructions that, when executed by processing circuitry in a wireless network node configured to support paging of user terminals by a base station that supports first and second paging modes, the second paging mode providing extended coverage relative to the first paging mode and using more resources than the first paging mode, said computer program instructions configuring the wireless network node to:
  determine that the second paging mode is needed for a user terminal, wherein the determination of the second page that is needed for the user terminal comprises a step of receiving a message ordering the base station to page the user terminal according to the second paging mode; and
  initiate paging of the user terminal according to the second paging mode, in response to determining, wherein the initiation of paging of the user terminal according to the second paging mode comprises a step of transmitting one or more paging messages for the user terminal, using a message format corresponding to the second paging mode, and wherein the message orders the base station to first page the user terminal according to the first paging mode and to then page the user terminal according to the second paging mode in the event that paging the user terminal according to the first paging mode is unsuccessful.

24. A method in a user terminal that supports first and second paging modes, the second paging mode providing extended coverage relative to the first paging mode and using more resources than the first paging mode, the method comprising:

determining that the user terminal should monitor for paging messages according to the second paging mode by evaluating an operational history for the user terminal with respect to operation in a coverage extension mode, wherein determining comprises a step of transmitting a message ordering a base station to page the user terminal according to the second paging mode; and responsive to said determining, monitoring for paging messages according to the second paging mode, wherein monitoring for paging messages according to the second paging mode comprises a step of receiving one or more paging messages for the user terminal, using a message format corresponding to the second paging mode, and wherein the message orders the base station to first page the user terminal according to the first paging mode and to then page the user terminal according to the second paging mode in the event that paging the user terminal according to the first paging mode is unsuccessful.

25. The method of claim 24, wherein determining that the user terminal should monitor for paging messages according to the second paging mode comprises determining that the user terminal has used the coverage extension mode within an immediately preceding interval of time defined by a predetermined threshold value.

26. The method of claim 24, wherein determining that the user terminal should monitor for paging messages according to the second paging mode comprises determining that the user terminal used the coverage extension mode when most recently operating in the current cell.

27. The method of claim 24, further comprising:

detecting a paging message according to the second paging mode; and indicating, in a response to the paging message, that the user terminal is responding to a page sent according to the second paging mode.

28. A user terminal configured to support first and second paging modes, the second paging mode providing extended coverage relative to the first paging mode and using more resources than the first paging mode, the user terminal comprising:

a transceiver configured for sending signals to and receiving signals from a wireless network; and processing circuitry configured to:

determine that the user terminal should monitor for paging messages according to the second paging mode by evaluating an operational history for the user terminal with respect to operation in a coverage extension mode, wherein determining comprises a step of transmitting a message ordering a base station to page the user terminal according to the second paging mode; and responsive to said determining, monitor, via the transceiver, for paging messages according to the second paging mode, wherein monitoring for paging messages according to the second paging mode comprises a step of receiving one or more paging messages for the user terminal, using a message format corresponding to the second paging mode, and wherein the message orders the base station to first page the user terminal according to the first paging mode and to then page the user terminal according to the second paging mode in the event that paging the user terminal according to the first paging mode is unsuccessful.

29. The user terminal of claim 28, wherein the processing circuitry is configured to determine that the user terminal should monitor for paging messages according to the second paging mode by determining that the user terminal has used the coverage extension mode within an immediately preceding interval of time defined by a predetermined threshold value.

30. The user terminal of claim 28, wherein the processing circuitry is configured to determine that the user terminal should monitor for paging messages according to the second paging mode by determining that the user terminal used the coverage extension mode when most recently operating in the current cell.

\* \* \* \* \*

UNITED STATES PATENT AND TRADEMARK OFFICE
CERTIFICATE OF CORRECTION

PATENT NO. : 10,091,763 B2
APPLICATION NO. : 14/913168
DATED : October 2, 2018
INVENTOR(S) : Johan Bergman et al.

Page 1 of 1

It is certified that error appears in the above-identified patent and that said Letters Patent is hereby corrected as shown below:

On the Title Page

(72) Inventors: Delete "Johan Bergman, Stockholm (SE); Konstantinos Dimou, San Francisco, CA (US); Erik Eriksson, Lingköping (SE); Anders Wallén, Ystad (SE)" and insert -- Johan Bergman, Stockholm (SE); Konstantinos Dimou, San Francisco, CA (US); Erik Eriksson, Linköping (SE); Anders Wallén, Ystad (SE) --, therefor Signed and Sealed this
Ninth Day of July, 2019

Andrei Iancu
*Director of the United States Patent and Trademark Office*